(12) United States Patent
Bruestle et al.

(10) Patent No.: US 11,816,572 B2
(45) Date of Patent: Nov. 14, 2023

(54) HARDWARE ACCELERATED MACHINE LEARNING

(71) Applicants: Jeremy Bruestle, Seattle, WA (US); Choong Ng, Seattle, WA (US)

(72) Inventors: Jeremy Bruestle, Seattle, WA (US); Choong Ng, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 17/501,314

(22) Filed: Oct. 14, 2021

(65) Prior Publication Data

US 2022/0067522 A1    Mar. 3, 2022

Related U.S. Application Data

(63) Continuation of application No. 15/399,714, filed on Jan. 5, 2017, now Pat. No. 11,170,294.

(60) Provisional application No. 62/276,169, filed on Jan. 7, 2016.

(51) Int. Cl.

| | |
|---|---|
| *G06N 3/08* | (2023.01) |
| *G06N 20/00* | (2019.01) |
| *G06F 7/02* | (2006.01) |
| *G06F 5/01* | (2006.01) |
| *G06N 3/063* | (2023.01) |

(52) U.S. Cl.
CPC ................ *G06N 3/08* (2013.01); *G06F 5/01* (2013.01); *G06F 7/023* (2013.01); *G06N 20/00* (2019.01); *G06F 2205/00* (2013.01); *G06F 2207/4824* (2013.01); *G06N 3/063* (2013.01)

(58) Field of Classification Search
CPC ............ G06N 3/08; G06N 20/00; G06N 3/06
See application file for complete search history.

(56) References Cited

U.S. PATENT DOCUMENTS

| 5,138,695 A | 8/1992 | Means et al. |
| 5,625,825 A | 4/1997 | Rostoker et al. |
| 5,751,987 A | 5/1998 | Mahant-Shetti et al. |

(Continued)

FOREIGN PATENT DOCUMENTS

WO    2006/115896 A2    11/2006

OTHER PUBLICATIONS

Chen et al "DianNao: A Small-Footprint High-Throughput Accelerator for Ubiquitous Machine-Learning", Mar. 1, 2014 (Mar. 1, 2014), ACM SIGPLAN Notices, v.49 n.4, pp. 269-284. (Year: 2014).*

(Continued)

*Primary Examiner* — Alexey Shmatov
*Assistant Examiner* — Clint Mullinax
(74) *Attorney, Agent, or Firm* — Nicholson De Vos Webster & Elliott LLP

(57) ABSTRACT

A machine learning hardware accelerator architecture and associated techniques are disclosed. The architecture features multiple memory banks of very wide SRAM that may be concurrently accessed by a large number of parallel operational units. Each operational unit supports an instruction set specific to machine learning, including optimizations for performing tensor operations and convolutions. Optimized addressing, an optimized shift reader and variations on a multicast network that permutes and copies data and associates with an operational unit that support those operations are also disclosed.

17 Claims, 4 Drawing Sheets

(56) References Cited

U.S. PATENT DOCUMENTS

| | | | |
|---|---|---|---|
| 5,892,697 | A | 4/1999 | Brakefield |
| 6,216,167 | B1 | 4/2001 | Momirov |
| 6,285,779 | B1 | 9/2001 | Lapidous et al. |
| 6,571,268 | B1 | 5/2003 | Giacalone et al. |
| 6,768,992 | B1 | 7/2004 | Jolitz |
| 9,747,547 | B2 | 8/2017 | McCormick et al. |
| 2002/0062466 | A1 | 5/2002 | Noguchi |
| 2002/0075871 | A1 | 6/2002 | Blanc et al. |
| 2002/0126661 | A1 | 9/2002 | Ngai |
| 2003/0206630 | A1 | 11/2003 | Rarick |
| 2004/0078418 | A1 | 4/2004 | Law et al. |
| 2006/0259744 | A1 | 11/2006 | Matthes |
| 2007/0005322 | A1* | 1/2007 | Patzer ............ G01R 31/318364 703/14 |
| 2007/0211064 | A1 | 9/2007 | Buck et al. |
| 2009/0187746 | A1 | 7/2009 | Symes et al. |
| 2009/0313195 | A1 | 12/2009 | McDaid et al. |
| 2010/0005221 | A1* | 1/2010 | Nieminen ........... H04L 49/9047 711/E12.082 |
| 2010/0076915 | A1 | 3/2010 | Xu et al. |
| 2011/0029471 | A1 | 2/2011 | Chakradhar et al. |
| 2011/0206053 | A1 | 8/2011 | Henry et al. |
| 2012/0005141 | A1 | 1/2012 | Sasagawa |
| 2013/0054665 | A1 | 2/2013 | Felch |
| 2014/0040700 | A1 | 2/2014 | Kobori et al. |
| 2014/0136583 | A1 | 5/2014 | Hyde et al. |
| 2014/0188968 | A1 | 7/2014 | Kaul et al. |
| 2014/0344194 | A1 | 11/2014 | Lee et al. |
| 2015/0199963 | A1 | 7/2015 | Maaninen |
| 2015/0324685 | A1 | 11/2015 | Bohn et al. |
| 2016/0344629 | A1* | 11/2016 | Gray .................... H04L 49/106 |
| 2016/0379137 | A1 | 12/2016 | Burger et al. |

OTHER PUBLICATIONS

Lozito et al, "FPGA Implementations of Feed Forward Neural Network by using Floating Point Hardware Accelerators", Mar. 2014, Theoretical and Applied Electrical Engineering, v. 12 n. 1, all pages. (Year: 2014).*

"International Search Report and Written Opinion" for PCT Application No. PCT/US2017/012600 dated Mar. 27, 2017, 7 pages.

European Patent Office, "Communication under Rule 71(3) EPC: Intention to Grant," issued in connection with European Patent Application No. 17736464.3, dated Sep. 15, 2020, 50 pages.

European Patent Office, "Decision to grant a European patent pursuant to Article 97(1) EPC," issued in connection with European Patent Application No. 17736464.3, dated Jan. 28, 2021, 2 pages.

European Patent Office, "Invitation pursuant to Rule 63(1) EPC," issued in connection with European Patent Application No. 21158563. 3, dated May 18, 2021, 6 pages.

European Search Report from related application EP 17796609 dated Dec. 13, 2019.

European Search Report from related application EP 17796609 dated Apr. 2, 2020.

European Search Report from related application EP 17796610 dated Dec. 13, 2019.

Farabet et al., "NeuFlow: A runtime reconfigurable dataflow processor for vision", 2011 IEEE Computer Society Conference on Computer Vision and Pattern Recognition Workshops, CVPRW 2011, Jun. 2011, pp. 109-116.

Final Office Action, U.S. Appl. No. 15/399,714, dated Jan. 2, 2020, 35 pages.

International Preliminary Report on Patentability, PCT App. No. PCT/US2017/012600, dated Jul. 19, 2018, 6 pages.

International Search Report and Written Opinion dated Oct. 2, 2017, for PCT Application No. PCT/US2017/031477, 10 pages.

International Search Report and Written Opinion dated Oct. 24, 2017, for PCT Application No. PCT/US2017/031478, 10 pages.

Jones et al., "Learning in Linear Systolic Neural Network Engines: Analysis and Implementation", IEEE Transactions on Neural Networks, Jul. 1, 1993.

Kanoun et al., "Low power and scalable many-core architecture for big-data stream computing", 2014 IEEE Computer Society Annual Symposium on VLSI, Jul. 2014, pp. 468-473.

Lozito et al., "FPGA Implementations of Feed Forward Neural Network by Using Floating Point Hardware Accelerators," Theoretical and Applied Electrical Engineering vol. 12, No. 1, Mar. 2014 (http://advances.utc.sk/index.php/AEEE/article/view/831).

Minkenberg, "On packet switch design", Eindoven University of Technology, Jan. 1, 2001.

Non-Final Office Action, U.S. Appl. No. 15/399,714, dated Dec. 16, 2020, 31 pages.

Notice of Allowance, U.S. Appl. No. 15/399,714, dated Jul. 8, 2021, 13 pages.

Supplementary European Search Report and Search Opinion, EP App. No. 17736464.3, dated Jun. 21, 2019, 9 pages.

Tianshi Chen et al: "DianNao: A Small-Footprint High-Throughput Accelerator for Ubiquitous Machine-Learning", Mar. 1, 2014 (Mar. 1, 2014), ACM SIGPLAN Notices, v.49 n.4, pp. 269-284. (Year: 2014).

Zuras et al: "IEEE Standard for Floating-Point Arithmetic", Jun. 12, 2008, IEEE, v.754, pp. 1-52. (Year: 2008).

Decision to grant a European patent, EP App. No. 21158563, dated Oct. 20, 2022, 2 pages.

Intention to grant European patent EP App. No. 21158563, dated Jun. 9, 2022, 6 pages.

Chen et al., "DianNao: A small-footprint high-throughput accelerator for ubiquitous machine-learning", ACM SIGARCH Computer Architecture News, vol. 42, No. 1, Feb. 2014, pp. 269-284.

European Search Report and Search Opinion, EP App. No. 21158563. 3, dated Sep. 9, 2021, 6 pages.

European Search Report and Search Opinion, EP App. No. 21208402. 4, dated Feb. 28, 2022, 5 pages.

Jindal et al., "Exploiting GPUs with the Super Instruction Architecture", International journal of parallel programming, vol. 44, No. 2, Aug. 20, 2014, pp. 309-324.

Lu et al., "Empirical performance model-driven data layout optimization and library call selection for tensor contraction expressions", Journal of Parallel and Distributed Computing, vol. 72, No. 3, Mar. 2012, pp. 338-352.

Intention to Grant, EP App. No. 21208402.4, Jan. 5, 2023, 6 pages.

* cited by examiner

HARDWARE ACCELERATED MACHINE LEARNING

CROSS REFERENCE TO RELATED APPLICATION

This patent application is a continuation of co-pending U.S. patent application Ser. No. 15/399,714, filed on Jan. 5, 2017, which claims priority to Provisional Patent Application Ser. No. 62/276,169, entitled "Memory and Processing Architecture for Hardware Accelerated Machine Learning," filed Jan. 7, 2016, which is hereby incorporated by reference herein in its entirety.

BACKGROUND

Machine learning is a subfield of computer science which focuses on algorithms which can learn from and make predictions based on data. Machine learning heavily draws upon neural networks for implementation and became practical for broad usage with the advent of cloud computing which made access to large amounts of computational processing power economical. Indeed, cloud computing and generally inexpensive computer processing has made more computationally expensive and computationally resource intensive variations of machine learning, such as deep belief networks which involve implementing layers of networks economically accessible.

Accordingly, machine learning is generally performed usmg general purpose central processing units ("CPU"), graphical processing units ("GPU"), or bulk general purpose processing hardware. Machine learning processors have been proposed where hardware acceleration was based on techniques to target a specific algorithm and/or network architecture. Alternatively, machine learning hardware has been proposed based on modeling the hardware more closely to neurologic architecture. In these cases, where acceleration was based on the assumption that a neurological architecture would inherently yield performance improvements, rather than performing hardware acceleration on computer instructions and computer instruction processing.

BRIEF DESCRIPTION OF THE DRAWINGS

The Detailed Description is set forth with reference to the accompanying figures.

DETAILED DESCRIPTION

Context of Hardware Accelerated Machine Learning

Figure 1:
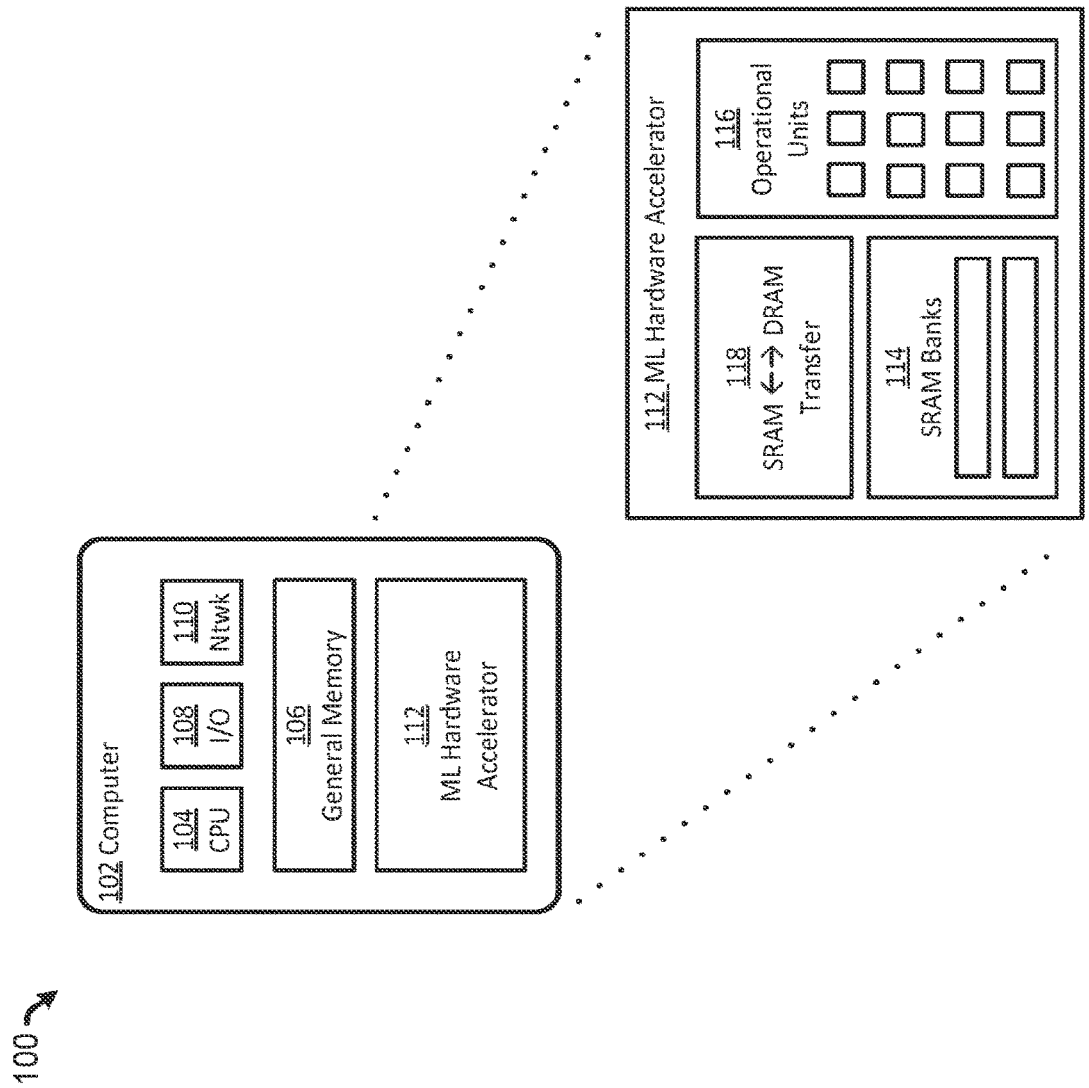
FIG. 1 is a top level context diagram for Hardware Accelerated Machine Learning.

As stated above, machine learning is a subfield of computer science which focuses on algorithms which can learn from and make predictions based on data. Typically these algorithms take the form of methods which process exemplar data and then make generalizations to similar data. Often these methods take the form of statistical regression or classification, although the field also includes methods such as reinforcement learning which model the learning behavior of a reward-seeking agent's interaction with the environment.

Recently, a set of methods typically referred to as "deep learning" have become common in multiple commercially relevant uses. These methods are based on artificial neural network research although in most cases modem deep learning techniques do not attempt to directly model known aspects of biological cognition. Instead they use the idea of a series of "layers" of "processing units", each which is typically composed of a linear operation followed by a nonlinearity. These layers may also include random processes, and are typically, although not universally, densely connected.

These methods may include multilayer perceptrons, convolutional networks, long short term memory, deep Q learning, restricted Boltzmann machines, and many other methods. While these methods differ in many respects, they share a common logical structure of layers which process inputs and generate outputs, possibly recurrent in time, and possibly utilizing stochastic noise. They may also utilize the concept of a "loss function" which represents for a given set of data how well the network is performing. Typically this loss function is further decomposed into a utility function which represents the loss relative to the exemplar dataset, as well as a regularization loss which seeks to mm1m1ze complexity and improve generalization performance. Typically, but not universally, such systems learn via stochastic gradient descent, often with additional extensions.

Regardless, both the training of deep learning networks, as well as the use of trained networks, can be broken down into a very simple pattern of fundamental computational building blocks. These are generalized tensor contractions, additive noise, and element-wise nonlinearities. Although not always abstracted this way, a wide variety of deep learning methods, as well as other machine learning or general computation can be accomplished via these primitives.

These primitives may be implemented in terms of a typical central processing unit ("CPU") architecture, or may be implemented via a graphical processing unit ("GPU"), which is a type of vector processor typically used for graphics workloads. However, the consistent data flow, large number of multiplications, and specialized nature of the non-multiplication operations allows for significant acceleration via hardware. Hardware acceleration approaches have been proposed, many of which are either highly specific to a particular network architecture or machine learning algorithm, or are neuromorphic, in that they seek to duplicate the behavior of biological networks, rather than implement deep learning algorithms.

In contrast to those approaches, we propose an approach to hardware accelerated machine learning that is not specific to a network architecture or machine learning algorithm nor is neuromorphic. Note that typical machine learning workflows comprise three basic operations: tensor contractions, addition of random noise, and element-wise non-linear operations. Of these, tensor contractions typically make up the bulk of the computational work on traditional computing architectures. Accordingly, we propose a computing architecture to perform these operations along with an associated computer instruction set. FIG. 1 is a context diagram 100 of such an architecture.

Machine learning hardware acceleration is generally in the context of a computer 102. Computer 102 may be any computing device including a standalone computer, a networked server, or an embedded system specific to machine learning. Computer 102 generally has a central processing unit ("CPU") that is any processor that executes computer readable instructions ranging from general purpose CPUs to embedded controllers.

The CPU is communicatively coupled via a bus to a general memory 106. The general memory 106 may be comprised of dynamic random access memory ("DRAM"), but this need not always be the case. The general memory 106 is any computer readable media and may store an operating system and other applications each comprised of computer readable instructions.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The input/output ("I/O") interface 108 facilities interaction of the computer 102 with other devices. The I/O interface 108 may be any controller card, such as a universal asynchronous receiver/transmitter (UART) used in conjunction with a standard I/O interface protocol such as RS-232 and/or Universal Serial Bus (USB). In the case of highly parallel applications such as machine learning, the I/O interface may facilities one or more I/O channels and/or parallel I/O channels.

The network interface 110, may potentially work in concert with the I/O interface 108 and may be a network interface card supporting Ethernet and/or Wi-Fi and/or any number of other physical and/or datalink protocols. Again, in the case of highly parallel applications such as machine learning, multiple network interfaces 110 may be supported by the computer 102.

The computer 102 can host one or more machine learning hardware accelerators 112. The hardware accelerator 112 is comprised of multiple banks of computer memory 114 such as static random access memory ("SRAM"). The SRAMs 114 support concurrent random access. The In one embodiment the SRAMs 114 support very wide memory access (e.g., multiple byte access within a single computer instruction), thereby supporting accessing vectors and larger sets of values in a single computer instruction. Note that with respect to the hardware accelerator 112, the banks of computer memory 114 are local but the general memory 106 is non-local. At times, the hardware accelerator 112 may exchange local and non-local data. Such transfers are described below.

The SRAMs 114 are accessed and operated on by multiple operational units 116. The operational units 116 are capable of simultaneously performing compute operations and support a machine learning operation specific instruction set. The operational units 116 lend themselves to many machine learning optimizations. In one embodiment, the operational units 116 may be configured to perform lower precision fixed point operations. For example, the IEEE 32 bit standard specifies 23 explicit bits for the mantissa of a floating point number. A lower precision floating point operation would have less than 23 bits to represent the mantissa. Specifically, although most deep learning research has been done using 32 bit precision floating point arithmetic to represent real numbers, recent findings have shown that for most deep learning workloads, much lower precision and fixed point methods (less than 32 bit) can be utilized, particularly if randomized round is utilized. The operational units 116 are described in further detail below.

An SRAM/DRAM transfer unit 118 facilities fast transfer of data between general memory 106 and the SRAM banks 114. Specifically the SRAM/DRAM transfer unit 118 supports bulk copy operations such that large (multibyte) data transfers may be performed in a single operation.

A machine learning hardware accelerator 112 contains additional features which are described in greater detail with respect to FIG. 2 below and elsewhere in this disclosure.

Definitions and Notation

Generally, both input data (i.e., examples to be learned or acted on), as well as weight data (i.e., network parameters), are naturally represented as multidimensional tensors. Typically, for the purposes of machine learning use cases, these tensors do not use have a notion of covariant or contravariant indexes. Also, symmetric tensors may be relevant, but such symmetry is often not formalized or is maintained explicitly via the operations, rather than being an aspect of the tensor itself, making the use of tensors in machine learning more similar to multi-dimensional arrays. In addition, contractions have some slightly variant properties. For example, convolutions often do not exactly match the typical tensor calculus notions of a contraction, but are quite computationally similar. Thus we define a slightly more computational notion of tensors and contractions herein.

Tensor

A tensor is defined herein as a multidimensional rectangular array of real numbers, usually represented by a relatively low precision (such as 16 bit rather than 32 bit) fixed point representation. Usually tensor data is stored in dynamic random access memory ("DRAM"), and has a simple stride base layout, or is composed of a set of "tiles", each of which has a stride based layout.

Tensor Contraction

For the purposes of this work, a tensor contraction is defined as an operation taking two input tensors, and producing an output tensor, via a set of multiplication and accumulation operations. Tensor contractions are defined via a set of "index variables". The range of each index variable is a simple integer number, and is often, but not always, simply the size of one of the tensor's dimensions, and the range of tensor indexes can be specified independently. Specially, a tensor contraction has the form:

$$O[i,j,\ldots]=A[P,Q,\ldots]*B[X,Y,\ldots]$$

Here, the lower case indexes, i, j, etc., represent a specific tensor index, the capital letters outside of the brackets represent tensors, and the capital letters in the brackets are multivariate polynomials of degree 1 or 0 over the set tensor indexes in full generality, but typically are also just a single tensor index. The operation is presumed to loop over the range of all indexes not specified on the output and add the results of the multiplication of the left and right tensor elements similar to Einstein notation. For example, a matrix multiply operation would be represented in this notation as:

$$O[i,j]=A[i,k]*B[k,j]$$

A convolution of a three dimensional image (composed of X, Y, and C dimensions, i.e., horizontal and vertical pixel location and a color or feature channel) with a four dimensional convolutional kernel which operates over an image patch across all channels, would be represented as:

$$O[x,y,co]=A[i,j,co,ci]*B[x+i,y+j,ci]$$

Here, we see the use of simple polynomial (x+i). Note, the range of x, y, i, j, co, etc., must all be specified to make this a complete description of the operation to be performed. In many cases, the logical option is to presume that the range of an index is identical to the size of the dimensions which it operates over, but this is not universally applicable.

We may also generalize both the operation performed for each pair of tensor elements (in this case multiplication) as well as the method to accumulate elements (in this case summation). When the accumulation mechanism is not addition, we specify it as in the following example, which implements "max-pooling", and also illustrates the use of a "constant" tensor which is 0 dimensional an contains a single element (in this case 1):

$$O[x,y]=\max \text{ over } A[x+i,y+j]*B[0]$$

For 2×2 max pooling, i and j would range over [0, 2).

Parameters

The machine learning hardware accelerator described herein is configurable. To provide examples to further understanding, a typical value as well as any likely constraints are given for some design parameters. Of course as the hardware accelerator disclosed is only meant as a concrete example of one method of implementing the fundamental operations described via efficient hardware implementation, and these values are not to be construed as limiting.

SRAM BANKS: Number of primary static random access memory ("SRAM") banks, minimum of 2, typically 8.

ELEM_WIDTH: Bit width of an element, typically 16, minimum 2.

ACCUM WIDTH: Width of an accumulator, typically 48, must be >=2*ELEM WIDTH.

SRAM WIDTH: Number of elements read during a single SRAM access of a single bank, typically 512. Generally a power of 2.

SRAM DEPTH: Number of SRAM rows, each holding SRAM_WIDTH*ELEM_WIDTH bits. Typically 4096, resulting in a total size of SRAM of SRAM BANKS*ELEM WIDTH*SRAM WIDTH*SRAM DEPTH/8=20 MB.

SHIFT_WIDTH: Number of elements that are the output of SRAM banks after the rotation unit, must be <=(SRAM_BANKS−1)*SRAM_WIDTH, typically 2048. Generally a power of 2.

NUM UNITS: Number of operations units, must be >=SHIFT_WIDTH, typically significantly larger, for example, 131072. Generally a power of 2.

INDEX WIDTH: Width of an index register, typically 32 bits. NUM_INDEXES: Number of index registers, typically 8.

Note that the memory widths, in particular the SRAM WIDTH are relatively large. This is to enable the processing of tensor elements in a single operation. Specifically, large memory widths available on a single access enable vectors and entire tensor elements to be accessed during that single operation. Otherwise, multiple accesses and multiple operations would be used thereby slowing down operation of tensor calculations.

Components for a Machine Language Hardware Accelerator

Figure 2:
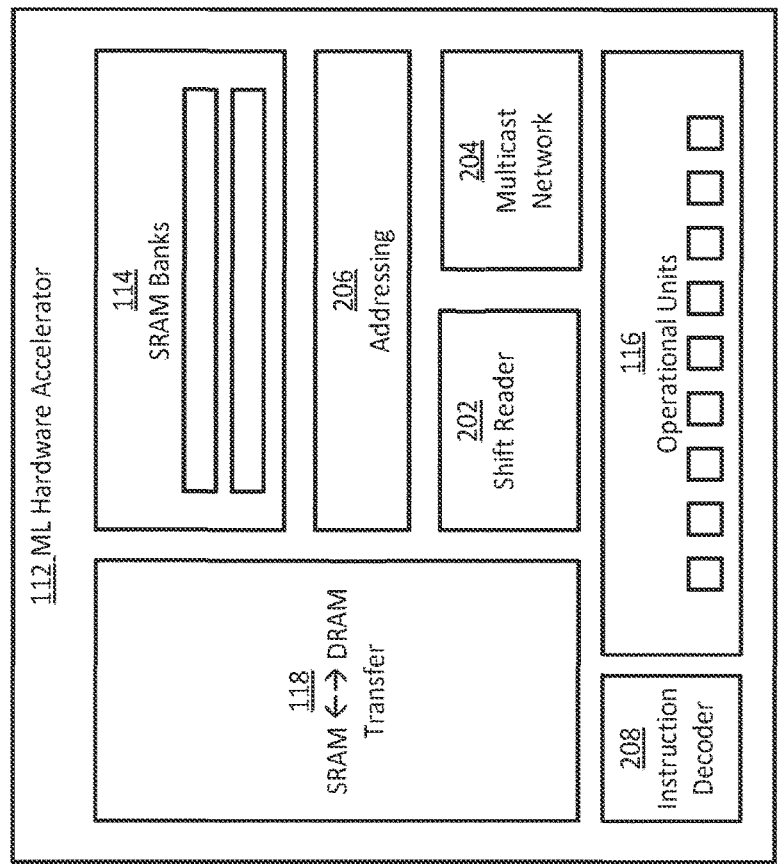
FIG. 2 is a block diagram of an example architecture for Hardware Accelerated Machine Learning.

FIG. 2 is a block diagram 200 of a machine language hardware accelerator 112. A machine language hardware accelerator is typically implemented as logic gates within a single integrated circuit. In some embodiments, a machine language hardware accelerator 112 may be implemented in a field programmable gate array ("FPGA") device or equivalent. In production, a machine language hardware accelerator 112 may be implemented as a custom chip comprised of multiple logic gates.

A machine language hardware accelerator 112 is comprised of the following components:
Data SRAM 114
Shift Reader 202
Multicast Network 204
Operation Units 116
Index Registers (Addressing) 206
DRAM Transfer Unit 118
Instruction Decoder 208

These components are individually described in greater detail below.

Data SRAM

The machine learning hardware accelerator keeps most data to be operated on in multiple banks of SRAM (typically dual-port). There shall be SRAM BANKS number of banks, each holding SRAM DEPTH rows, each consisting of SRAM_WIDTH*ELEM_WIDTH bits, which are logically viewed as SRAM_WIDTH elements of ELEM_WIDTH size. SRAM is viewed logically as a single linear address space consisting of elements of ELEM_WIDTH bits in size, with a total of SRAM_BANKS*SRAM_WIDTH*SRAM DEPTH elements. Logical SRAM location i, referred to as M[i] below, exists at a location computed by:

$LR=\text{floor}(i/\text{SRAM\_WIDTH})$ $LO=i-LR$ $B=LR \text{ \% SRAM BANKS}$ $R=LR/\text{SRAM BANKS}$ $O=LO*\text{ELEM WIDTH}$ where LR represents the "logical row", LO represents the "logical element offset" within the row, and B is the physical bank number, R is the physical row number within that back, and O is the bit offset within that row of the first bit of the element, the following ELEM_WIDTH bits comprising the whole of the element. (Note that the % operator is the modulus operator).

Alternatives to the above approaches are presented below herein along with other modifications.

Shift Reader

Figure 3:
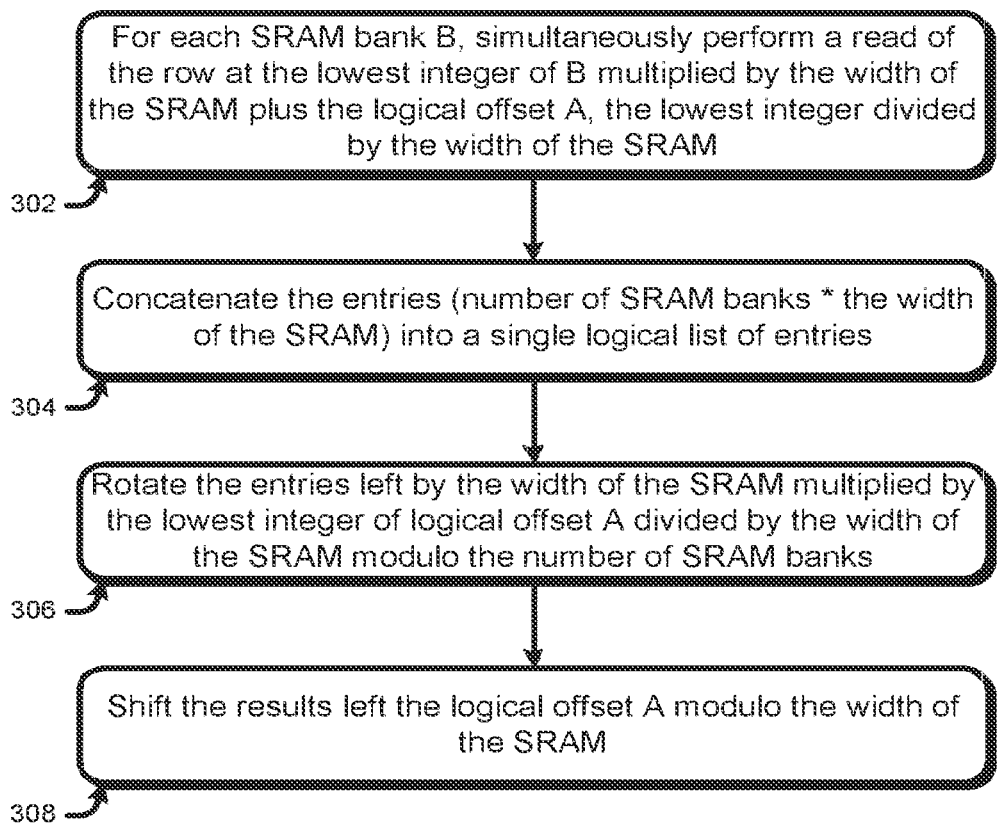
FIG. 3 is a flow chart for an exemplary operation of a shift register for Hardware Accelerated Machine Learning.

The shift reader 202 provides addressing logic and a barrel rotate and barrel shifter to allow logical access of SHIFT_WIDTH logically contiguous elements beginning at any logical offset, A, within SRAM. FIG. 3 is a flow chart 300 of the operation of the shift reader 202 given the address of the first element.

In block 302, for each bank B, simultaneously perform a read of row floor((A+B*SRAM_WIDTH)/SRAM_WIDTH).

In block 304, concatenate the SRAM_BANKS*SRAM_WIDTH entries into a single logical list of entries.

In block 306, rotate the results left by (floor(AISRAM_WIDTH) % SRAM_BANKS)*SRAM_WIDTH elements.

Shift the results left by A % SRAM_WIDTH elements.

Via proper pipelining, this results in a read of SHIFT WIDTH contiguous elements from any logical address per clock cycle. By duplicating the addressing and rotate/shift logical, for dual-port SRAM, this typically would be extended to up to two independent reads of SHIFT_WIDTH contiguous elements per clock cycle.

Multicast Network

Turning back to FIG. 2, the multicast network 204 provides a general mechanism to permute and duplicate entries being read by the shift reader 202 and apply them to the operation units 116. Specifically, on a per-instruction basis each operation unit 116 will be given one element from the multicast network 204, and each of these elements must come from an entry within the SHIFT_WIDTH outputs of the associated shift reader 202, or must be 0. The reordering and duplication done by the multicast unit 204 is not fixed, and may be varied by software. The modification is done through either a "preload" mechanism by which a multicast pattern is loaded into the multicast network 204, between groups of normal operation, or via additional "pattern" information present in each instruction, or some combination, allowing potentially per-instruction variability of the multicast. In typical use, there will be two independent multicast networks 204, each connected to an independent shift reader 202, allowing for two elements to be sent to each operation unit for each clock cycle. Multiple alternatives are explicitly contemplated below, and yet further alternatives are possible.

Generally, with regard to tensor contractions, each output is held in the accumulator of an operational unit 116, and the goal of the multicast network 204 is to route the two operands of the tensor operation (typically multiplication) from the input tensors or tiles to the appropriate operation unit.

A. Bit Operation Multicast Network

A bit operation multicast network 204 consists of a series of layers, each layer of which either passes the elements through identically, or performs some fixed permutation or fanout operation, based on a layer-wide bit specified in the currently executing instruction. The early layers are SHIFT_WIDTH elements wide, and via fanouts extend until the layers are NUM_UNITS elements wide. In implementation, a layer is envisioned to be set of fixed traces with layerWidth*ELEM_WIDTH one-bit multiplexers with a shared select line. In addition, it is envisioned that in order to meet timing requirements, layers of buffers may need to be inserted in parts of the multicast network 204. In this case, instruction execution will be pipelined such that the select line for later layers and operation arriving at the operation units is appropriately delayed relative to the original memory read.

The choice of the number of layers and the fixed permutations to use is based on providing maximal flexibility among typical machine learning work flows, specifically tensor contractions. Given that the output is considered to be a tile of a tensor, by rounding all tile sizes to a power of two, the bits of the binary index of an operation unit can be considered a set of coordinates, where each coordinate comprises a contiguous number of bits within the index. This limitation on tensor dimension sizes significantly simplifies the types of data rearrangement needed.

The input tensors will likely choose to use only some of these coordinates, possibly with an offset (i.e., the addition of tensor index appearing only on the right hand side). In addition, the input will likely choose to broadcast the same value across multiple output coordinates, for cases where a given input's tensor coordinates are independent of one of the output indexes.

For example, imagining SHIFT_WIDTH to be 16, each input arriving from the shift rotator may be given an index in the range [0,16), which can represented in binary as 4 bits (low bit firsts) as (i0, i1, i2, i3). Imagining NUM_UNITS to be 256, the output units may each be given an index similarly (o0, o1, o2 . . . o7).

Now, imagine one wished to take a 2×2 tensor I from the input, and apply it to a 2×2×2×2 tensor O, such that O[w,x,y,z] is given input from A[x,y].

This can be done by providing output (o0, o1 . . . ) the value from input (o2, o3, o4, o5). That is, there is a relation between which input element is sent to which operational unit, and the bits of the indexes of the associated input element and operational unit.

To perform these operations, two set of layers are used. The first set of layers, called the permutation layers, are designed to permute elements in ways which are useful to machine learning workflows. The second set of layers, called the duplication layers, duplicates entries, providing fanout.

The first set of layers consist of a series of "shuffles" that logically rearrange the bits of the index to allows transpose operations on tiles which have power of two sizes, as well as to allow "packing" entries for various accumulations. Or in other words, the first layer permutes the entries, such that the bits composing their indexes are also permuted.

To describe the details of this layer, we begin by defining a permutation operation, parameterized on a number, B which is between 0 and SHIFT_WIDTH-2 inclusive. This operation moves bit B+1 to the low bit, and shift all bits after bit B+1 to the left, leaving bits prior to B+1 as they are.

This permutation is described by the following python code:

```
def do_perm(x, B):
    N=len(x)
    P=2**(B+1)
    P2=2**(B+2)
    return [x[(i/P2)*P2+2*(i % P)+((i % P2)/P)] for i in
        range(N)]
```

We use 2*(SHIFT_WIDTH-1) layers, each of which performs a specific permutation, or performs an identity permutation. The permutations begin with B=SHIFT_WIDTH-2 and go down to 0, and then repeat the same pattern again. Describing this entire procedure in Python code, we write the following:

```
def do_perms(x, bits):
    B = int(math.log(len(x), 2)) # Number of bits
    L = 2*(B-1)
    for i in range(L):
        if bits[i]:
            x = do_perm(x, B - (i¾(B-1)) - 2)
        else:
            x=x
return x
```

For a simple example of a transpose of a 4×4 tensor, where SHIFT_WIDTH=4, we wish to perform permutations 0, 2 and 1 in that order. Since the permutation options are [2, 1, 0, 2, 1, 0], we wish to engage permutations in the bit pattern [0, 0, 1, 1, 1, 0]. Using the example code above we see:

x=[0, 1, 2, 3, 4, 5, 6, 7, 8, 9, 10, 11, 12, 13, 14, 15]
print do_perms(x, [0, 0, 1, 1, 1, 0])
Which outputs
[0, 4, 8, 12, 1, 5, 9, 13, 2, 6, 10, 14, 3, 7, 11, 15]

If we view the original X as a 4×4 tensor, this is clearly a transpose of that tensor.

Generally, it is possible to rearrange bits to invoke many types of tensor permutations. For two dimensional tensors, this allows all permutations. For three dimensional tensors, this supports 5 of the 6 possible permutations. For four dimensional tensors, this method supports 6 of the 12 possible permutations, specifically, those listed below:
0123
0132
0213
0231
0321
1023
1203
1230
1302
2013
2301
3012

Unsupported permutations may be implemented at the cost of additional cycles via doing contractions against a constant tensor to implement part of the permutation, followed by a second operation to implement the remaining permutation. However, by careful arrangement of tensor dimension order via software, this may be avoided in the vast majority of cases.

The second set of layers (after leaving the shift reader) serve to duplicate entries. Initially, the width of the layer doubles with each layer. If the duplication is invoked, each entry results in two entries. If the duplication is not invoked, the entries with the lower index are passed through, and the higher index entries are 0 filled. Once the layer width matches the number of operation units, further duplications copy half of the entries and discard the other half, and the pass-through case is a trivial identity function. The specific duplication pattern suggested varies at each layer, and is parameterized by the layer number L, which ranges from 0 to log 2(NUM_UNITS)−1, such that the vector of output entries O[i] is pulled from the set of input entries as follows:

$P=2^L$ $O[i]=I[\text{floor}(i/(2*P))*P+i \% P]$

As an illustrative example, presume that SHIFT_WIDTH=8, and that NUM_UNITS=16. This would result in 4 layers. Further, presume that the value read from the shift reader 202 were as follows:
0, 1, 2, 3, 4, 5, 6, 7

If the 0'th and 1'st duplication are engaged, but the 2'nd and 3'rd are left as identity, we arrive at the following input at the operation units 116
0, 0, 0, 0, 1, 1, 1, 1, 2, 2, 2, 2, 3, 3, 3, 3

If the 2'th and 3'rd duplication are engaged, but the 0'th and 1'st are left as identity, we arrive at the following input at the operation units
0, 1, 2, 3, 0, 1, 2, 3, 0, 1, 2, 3, 0, 1, 2, 3

B. Fully Reprogrammable Multicast Network

A fully reprogrammable multicast network 204 consists of a broadcast Benes network (also known as rearrangeable non-blocking network) with support for general 2×2 switching nodes which are capable of broadcast. Each switching node contains two bits to specify the permutation or broadcast operation to be performed, which are implemented via latches and 1 bit multiplexors. This allows arbitrary multicast patterns to be specified, which allows relating of any input to any set of outputs. If the SHIFT WIDTH<NUM_UNITS, the first $\log_2$(NUM_UNITS/SHIFT_WIDTH) layers of the network will be truncated, and any inputs which would have come from the prior layer can be presumed to be zero.

Reconfiguration of the permutation network requires the loading of (2 log(NUM_UNITS)−1)NUM_UNITS bits of data. This data may be loaded either via DRAM or SRAM. This loading will necessarily take a significant number of clock cycles, and requires support for addressing the latches within the permutation network. However, in cases where the number of cycles in which a given permutation is used is large enough, the generality of permutation support (including support for tensor widths which are not powers of two) may make this method worthwhile. Specifically, this method allows the full set of arbitrary polynomial indexes to be implemented in one cycle for input tiles which fit within SHIFT_WIDTH and output tiles which fit within NUM_UNITS. In addition, it is possible to provide resilience to manufacturing defects or damage leading to faulty operation units by allowing spare operational units to be connected in as replacements.

C. Parity Benes Multicast Network

The parity Benes multicast network is an option more general than the bit operation multicast network, but less intensive for reload operations than the fully reprogrammable multicast network.

This network has the same basic structure of the general broadcast Benes network above, however instead of configuring each switching node independently, each switching node for a given layer of the network is set to be the parity of its index AND-ed with a configurable per-layer value. That is, for layer 1, element i, the choice of which element from the switching node to pick is given by:

$c[1,i]=\text{PARITY}(\text{AND}(p[1],i))$ where, AND represents the element-wise AND of the log i(NUM_UNITS) bit wide index i with the per layer $\log_2$(NUM_UNITS) bit wide configuration value p[1]. PARITY (x) represent the parity function over the set of remaining bits.

This mechanism requires only log i(NUM_UNITS)(2 log 2(NUM_UNITS)−1) bits to specify p[1] for all layers, or for NUM_UNITS=64k, 496 bits However, all tensor permutations operations of tiles with widths which are a power of two, as well as all power two based multicasts are supported by this method, making it more general than the bit operation multicast network, but less expensive than the fully reprogrammable multicast network. In addition, while the full values of p[1] could be specified on a per instruction basis, it is also possible to specify the logical permutation and broadcast operation to be performed and compute the required bits via a combinatorial circuit on-chip, resulting in a reduced instruction width, or removing the need to perform an additional SRAM lookup. Finally, permutations could be stored in a small independent SRAM, allowing small instructions which only index data.

This idea of configuring the full set of switching nodes using a function of a smaller set of configuration parameters and the node index can be generalized.

D. Benes Permutation Network and Simple Duplication Network

In this variant, the permutation portion of the bit operation multicast network is replaced by a simple Benes network (non-broadcast) for which the configuration is loaded, however the fixed set of duplication layers is retained. Because the number of bits needed to specify an arbitrary Benes permutation layer is $(2 \log_2(B)-1)B/2$ bits, if SHIFT_WIDTH<=ELEMENT_WIDTH, such a network can be loaded from SRAM in a single read.

Operation Units

The operation units 116 consist of a large number (NUM_UNITS) of independent and identical units 116, each of which typically would contain three registers, A, R, and S, and a number of functional units. In addition, each operation unit 116 receives two elements per clock cycle, one from each multicast network 204. These values are called B and C, and are ELEM_WIDTH bits wide. The operational units 116 are all controlled by a single instruction decoder, and all perform the same operation each clock cycle.

During each clock cycle, each operation unit 116 performs an operation based on its previous register values, the new inputs B and C from memory, and per instruction control elements including D, a 4 bit per instruction constant. Each operation unit 116 then updates its registers.

Operation Unit Registers

The operational unit 116 will have the following registers:

A—Accumulator register, holds ACCUM WIDTH bits interpreted as assigned integer

R—RNG state register, holds data used to generate pseudorandom numbers

S—Status register, hold 4 booleans S[0] to S[3]

Operations

During each cycle, the operational unit 116 logically performs operations comprised of computer instructions limited to a set of machine learning primitives. The primitives are atomic operations determined to perform operations used in machine learning that typically take multiple instructions in a traditional processor. Specifically, an atomic operation is an operation that is performed as a discrete unit of functionality and cannot be subdivided. Thus hardware that support functionality that can be performed in a single operation that takes multiple operations in a traditional processor accelerate performance of the functionality by the number of operations saved.

Examples of functionality to be performed in a single operation rather than multiple operations on a traditional processor include tensor contractions, addition of random noise, and element-wise non-linear operations. The instructions include the set of the following primitive operations:

SET: A:=B//Set Accumulator

MAC: A+=B*C//Multiply Accumulate

ARN: A+=R//Add D bits of Random Noise

LTR: A:=(A−B)*C//Linear transform

SHR: A:=A>>D//Shift right

CMP: S[D]:=(B<=A<=C)//Compare A to range, update S[D]

OUT: //Output data from operation units to SRAM, see overall operations

SRD: R=A//Seed RNG values

RET: //Return, done with this computation

In addition, during each cycle, unless the instruction is SRD, the R registers are updated to produce a new pseudorandom value. This may be done via a linear feedback shift register ("LFSR"), possibly linking R registers from multiple operation units to increase mixing.

This set of instructions could be extended as needed. For example, for max-pooling operations, the following additional instruction may be useful:

MMA: A:=max(A, B*C)//Multiply, Max Accumulate

Per Instruction Control Values for the Operation Units

The control values for the operation units 116 on a per-instruction basis are as follows:

Operation: Which operation to perform of those listed in the previous section.

Condition: For each S[i], what value S [i] must have to perform this operation. This can be 0, 1, or "don't-care" for each. The output of each test is AND-ed together to decide if the operation should be performed. Since each entry would typically be represented as 2 bits, this component of the instruction take 8 bits.

D: Value used for CMP and SHR.

Again, there are many variations. For example, the conditional execution could be defined as a 16 bit number, which represents under which of each of the 16 conditions possible based on S the operation should be performed.

Index Registers and Address Unit

The index registers 206 are global to the operation units 116 and the instruction decoder 208, and track various index variables to control addressing and allow looping and other operations to be performed easily. Each index register 206 stores an integer value, INDEX_WIDTH bits wide, and there are NUM_INDEXES registers.

Each instruction contains some number of address references, which allow the computation of an SRAM or DRAM address via the index registers.

Each address reference contains a base memory offset as well as a INDEX_WIDTH wide multiplier for each index register, for a total of NUM_INDEXES+1 values per address reference. To compute the memory address, the following sum is computed:

$$A = B + \text{Sum over } i=[0, \text{NUM\_INDEXES}) \text{ of } M[i]*R[i]$$

where B is the base address, and M[i] is the multiplier for each index register, and R[i] represents the current value of each index register.

Instructions also contain an index register update, which again consists of NUM INDEXES numbers of INDEX WIDTH size, U[i], as well as a set of booleans B[i] and performs the following update:

$$R[i] := B[i] ? (R[i]+U[i]) : U[i]$$

where U[i] is the list of index register updates and ? is the trinary if-then-else operator.

Thus for each instruction, memory references can be computed from index registers, and the index registers can be updated.

Finally, each instruction specifies an index register test, consisting of a choice of index register, i, to test, and a maximum value, M. The test is considered true if:

$$R[i] < M$$

Each instruction then specifies a next instruction number for both the case where the test is true, and the case where the test is false. This allows creation of looping constructs.

DRAM Transfer Unit

The DRAM transfer unit 118 is invoked in a separate section of each instruction, independent of the operation for the operation units. It specifies an SRAM and a DRAM location (possibly with some alignment requirements), as well as an operation (read or write). The operation may also be a no-op. This initiates a read/write to/from DRAM from/to SRAM. This operation will not complete by the beginning of the next instruction, due to the instruction pipeline depth relative to the DRAM latency, thus software must be aware of the latency. The width of the data transfer is typically as large as is possible given DRAM bandwidth.

Alternately, the DRAM transfer unit 118 may be restricted to only perform reads into SRAM, and writes may be sourced from the operational units. In this case, it is possible to perform pre-fetch from DRAM via the use of a second instruction decoder which operates some number of cycles ahead of the primary instruction decoder, and places results into an associative cache. Then, when the instruction is scheduled on the main instruction decoder, the value is fetched from the cache and written to SRAM, thus making DRAM access appear deterministic.

For write operations, a write though cache may be used to prevent the need for full DRAM round trip.

Instruction Decoder+SRAM

The instruction decoder 208 will typically contain its own SRAM, whose width is optimized for the largest possible instruction, although it may also reuse system SRAM, possibly including a caching mechanism to reduce bank read conflicts. Each cycle, the instruction decoder reads a new instruction and orchestrates the activity of the various units as described in the operation section.

Alternate SRAM Design

Alternately, the SRAM banks 114 may exist as 2 banks, each SHIFT_WIDTH elements wide. Each bank would typically feed one of the two shift registers and typically has very few addresses (as few as 4 per bank). This simplifies that addressing, causing exactly one address to be loaded onto the shift-loader, which then simply performs a rotate of the data from the single wide address. Outputs can be written to either bank, and sections of either bank can be scheduled to be written to or read from DRAM, possibly including a non-trivial mapping from multiple regions of DRAM to a single address. For example, presuming that 128 elements can be writing to DRAM for each clock cycle, one approach would be to support a write of any 128 element aligned offset within an address of either bank to be scheduled for read or write during each clock cycle.

Overall System Operation

Figure 4:
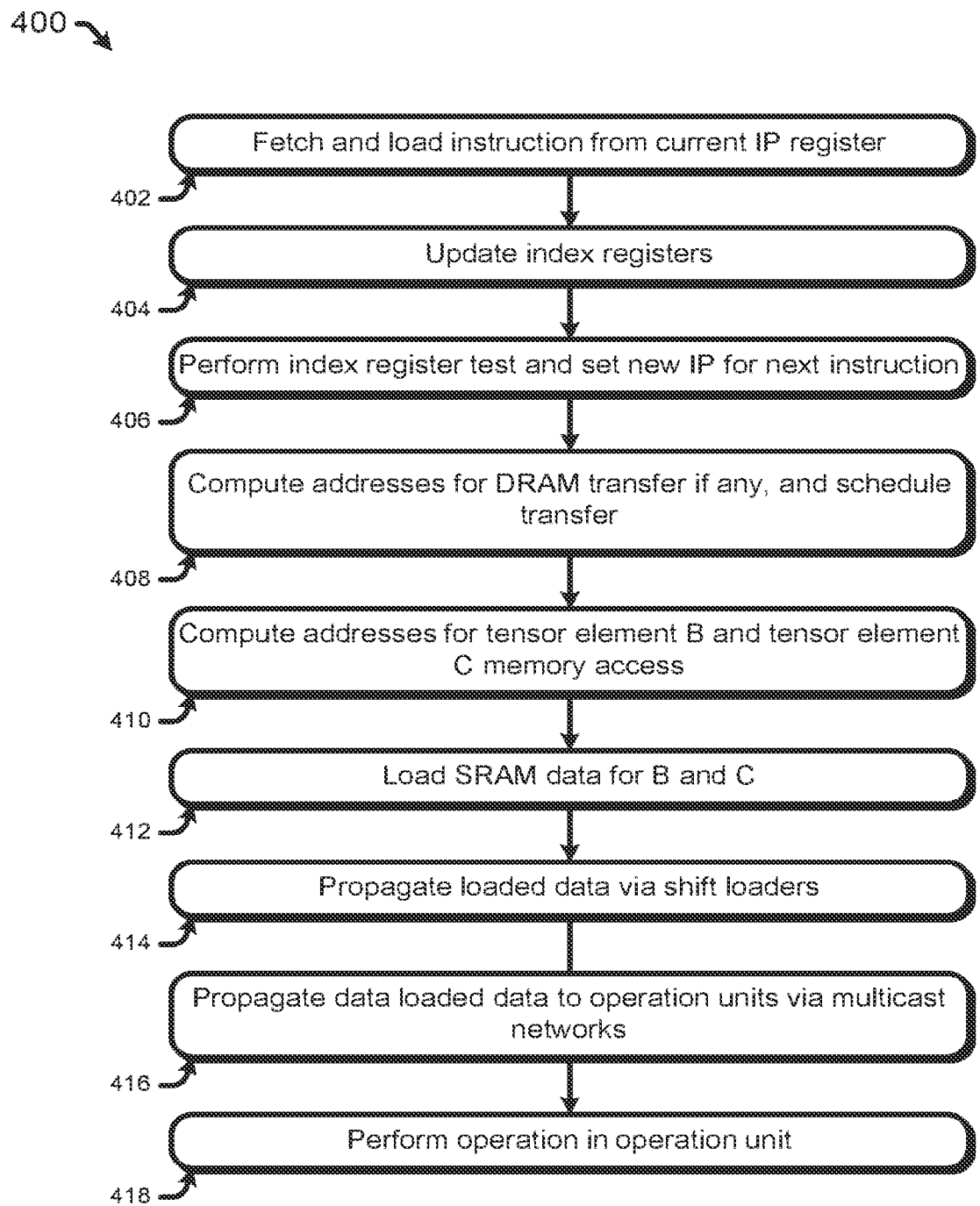
FIG. 4 is a flow chart for an exemplary operation for fetching and executing computer readable instruction in a machine learning hardware accelerator.

On each cycle, a single new instruction is read by the instruction decoder 208. Because instructions are heavily pipelined, operations for multiple previous instructions are occurring while the new instruction is being fetched by the decoder 208. FIG. 4 is a flow chart of the operation of the decoder 208. To clarify the flow, the logical order will be described here, but multiple independent steps may be scheduled on the same clock cycle if possible, and some steps, such as propagating the elements through the multicast network may take more than one clock cycle, with internal pipeline latches.

In block 402, fetch and load instruction from current instruction pointer ("IP") register.

In block 404, update index registers.

In block 406, perform index register test and set new IP for next instruction.

In block 408, compute addresses for DRAM transfer (if any) and schedule transfer via the DRAM transfer unit 118.

In block 410, compute addresses for tensor element B and tensor element C memory access, if relevant to the fetched instruction type.

In block 412, load SRAM data for B and C into SRAM data banks 114, if relevant to the fetched instruction type.

In block 414, propagate loaded data through shift loaders, if relevant to the fetched instruction type.

In block 416, propagate loaded data to operation units 116 through multicast networks 204, if relevant to the fetched instruction type.

In block 418, perform operation in the operation unit 116.

Note, if the operation to perform is "OUT", a contiguous portion of the data from the operation units is written to an SRAM location specified as a memory reference, with the portion being an aligned region with the operation unit index space and defined by another memory reference. Additionally, a write length is defined which may be less than SHIFT_WIDTH. Alternately outputs can be written directly to DRAM.

Example of a Convolution Use Case

The machine learning hardware acceleration techniques above can be used to implement the logical operation of generalized tensor contractions, additive noise, and element-wise nonlinearities. Since these operations are typically performed in the above order repeatedly for deep networks (once per layer), we presume this same order. However this is not required.

To make the operations concrete, we examine a specific operation, convolution followed by a random round, followed by a leaky RELU nonlinearity, of an image which is 256 wide by 256 high by 64 feature channels deeps with a kernel that is operates over a 3×3 x,y region, and maps 64 input channels to 64 output channels. The input tensor representing the image and the kernel will be presumed to already exist within SRAM organized such that:

$$D[ci,x,y]=M[D\_o+ci*65536+256*x+y]$$

$$K[i,j,ci,co]=K[K\_o+i*16384+j*4096+64*ci+co]$$

We will also presume area exists for the output at:

$$O[co,x,y]=M[O\_o+co*65536+256*x+y]$$

Where M[i] represent logical memory locations via the non-alternate memory layout. We also presume default values for all parameters. We presume the bit operation multicast network.

Logically, we iterate over every x value from 0 to 256 in steps of 6 elements, and for each one, compute the output for all y and co for the x values in question as a single tile, performing an inner accumulation over i, j, and ci. Then we add noise, reduce precision, and perform the nonlinearity, followed by writing out the results.

To do this, we map the various logical tensor indexes to index registers as follows:

$$r0=x\ r1=ci\ r2=i\ r3=j\ r4=co\ \text{(for output to main memory)}$$

We define two specific multicast patterns, one for the kernel, and the other for the input. For the kernel, we define a pattern which maps input elements [0,64) to all operational units, such that U[i]=I[i/2048]. This can be done via enabling all duplication layers<12, disabling all duplications layer>=layer 12, and disabling all permutation layers. We call this pattern PK.

For the input, we define a pattern which maps repeats all 2048 input elements 64 times. This can be done via enabling all duplication layers<6, disabling all duplications layer>=layer 6, and disabling all permutation layers, we call this pattern PI.

We also make a set of constants C, and load them into memory such that we can use the permutation layer pattern which enables all duplication layers and no permutations layers to provide the constant to all operational units.

The following is the logical instruction stream which performs the above operation:

```
00: SET// Zero all accumulators
    B=constant 0x0000
    r0 = 0, r1 = 0, r2 = 0, r3 = 0
01: MAC// Add up each row of i
    B=M[D o + 65536*r1 + 256*r0 + 256*r2 + r3] via PI
    C=M[K o + 16384*r2 + 4096*r3 + 64*r1] via PK
    r3 += 1 if (r3 < 2) goto 1, else goto 2
02: MAC// Add up each column of j
    B=M[D o + 65536*r1 + 256*r0 + 256*r2 + r3] via PI
    C=M[K o + 16384*r2 + 4096*r3 + 64*r1] via PK
    r2 += 1, r3 = 0
    if (r2 < 2) goto 1, else goto 3
03: MAC // Over each input channel
    B=M[D o + 65536*r1 + 256*r0 + 256*r2 + r3] via PI
    C=M[K o + 16384*r2 + 4096*r3 + 64*r1] via PK
    r1 += 1, r2 = 0, r3 = 0 if (r2 < 63) goto 1, else goto 4
04: ARN 15 bits// Add noise to implement random round
05: SHR 16 // Shift down by 16 to get back to 8.8
06: CMP -> S[0] // See if we are >= 0.0
    B=constant 0x0000
    C=constant 0x7fff
07: LTR if !S[0] //If less, multiply by .1 * 0x1000
    B=constant 0x0000
    C=constant Ox199
08: LTR if S[0] //If>=, multiply by 0x1000
    B=constant 0x0000
    C=constant 0x1000
09: ARN 11 bits// Add noise to implement random round
10: SHR 12 // Shift down to remove factor of 0x1000
    r4 = 0 if (r0 < 252) goto 11, else goto 13
11: OUT // Normal output case
    offset = 2048*r4
    M[D_o + 65536*r4 + 256*r0]
    size= 2048
    r4 += 1
    if (r4 < 64) goto 11, else goto 12
12: SET// Rezero accumulators and get next 6 rows
    B=constant 0x0000
    r0 += 6 goto 0
13: OUT// Special end output case to handle last 2 rowsoffset
    = 2048*r4
    M[D_o + 65536*r4 + 256*r0]
    size= 512
    r4 += 1
    if (r4 < 64) goto 11, else goto 14
14: RET
```

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
an instruction decoder to decode a matrix multiplication instruction;
a local memory comprising a plurality of static random-access memory (SRAM) banks to store at least a portion of a first input tensor and a second input tensor, each of the first and second input tensors comprising a multidimensional array of real numbers;
circuitry to permute a first plurality of the real numbers associated with the first input tensor in accordance with a permutation pattern included with the matrix multiplication instruction to generate a permuted first plurality of real numbers;
a hardware accelerator to multiply the first input tensor and the second input tensor to produce an output tensor, the hardware accelerator comprising:
a plurality of operational unit circuits to perform a plurality of parallel multiply-accumulate (MAC) operations in accordance with the matrix multiplication instruction, each operational unit circuit comprising:
a multiplier to multiply a first real number of the permuted first plurality of real numbers and a second real number of a second plurality of real numbers associated with the second input tensor to generate a product, and
an accumulator to add the product to an accumulation value to generate a result value, the first real number and the second real number each having a first bit width and the accumulation value having a second bit width at least twice the first bit width.

2. The apparatus of claim 1 wherein the hardware accelerator further comprises:
a plurality of accumulation registers, each accumulation register to store one of the accumulation values to be added to one of the products by the accumulator of one of the operational unit circuits.

3. The apparatus of claim 1 wherein the first input tensor comprises a first two-dimensional array comprising the first plurality of real numbers and the second input tensor comprises a second two-dimensional array comprising the second plurality of real numbers.

4. The apparatus of claim 3 wherein the first two-dimensional array comprises a kernel and the second two-dimensional array comprises an image to be convolved with the kernel.

5. The apparatus of claim 3 wherein the plurality of parallel multiply-accumulate (MAC) operations comprise:
multiplying each real number of the first plurality of real numbers in a row of the first two-dimensional array with a corresponding real number of the second plurality of real numbers in a column of the second two-dimensional array to generate the products; and
adding the products to generate the result value in a two-dimensional result array, the result value comprising a single real number in the two-dimensional result array.

6. The apparatus of claim 1 further comprising:
a memory interconnect to couple to a dynamic random access memory (DRAM) device.

7. The apparatus of claim 1 further comprising:
a processor coupled to the hardware accelerator; and
an input/output (TO) interconnect to couple the processor to an IO bus.

8. The apparatus of claim 1 wherein the circuitry to permute comprises a plurality of configurable switches.

9. The apparatus of claim 1 wherein the circuitry to permute is to perform a broadcast operation to route a single source data element to each of the plurality of operational unit circuits.

10. The apparatus of claim 1 wherein index values are to be generated to perform the permutation.

11. The apparatus of claim 1 wherein each operational unit comprises an accumulation register to store the accumulation value.

12. The apparatus of claim 1 wherein the first bit width is 16 bits.

13. The apparatus of claim 11 wherein the first and second plurality of real numbers comprise 16-bit floating-point data elements.

14. The apparatus of claim 1 further comprising: a cache coupled to one or more of the plurality of operational unit circuits.

15. The apparatus of claim 13 wherein the cache comprises a write through cache.

16. The apparatus of claim 1 wherein the circuitry to permute is to perform a permutation operation based, at least in part, on information included in the matrix multiplication instruction.

17. The apparatus of claim 10 wherein each of the index values are to be multiplied by a specified value to generate a result index value, the circuitry to permute to use the result index value to perform the permutation operation.

* * * * *